United States Patent [19]

Davis

[11] 4,268,066
[45] May 19, 1981

[54] RECREATIONAL VEHICLE WIND STABILIZER

[76] Inventor: Vernon E. Davis, 1324 Cypress St., Casper, Wyo. 82601

[21] Appl. No.: 72,618

[22] Filed: Sep. 5, 1979

[51] Int. Cl.³ .............................................. B60S 9/02
[52] U.S. Cl. .................................... 280/763; 52/149; 248/352; 403/85; 403/166
[58] Field of Search ............................... 280/763–766; 296/169, 167, 174; 212/145; 248/188.8, 352, 354 R; 52/143, 149, 150; 403/85, 166

[56] References Cited

U.S. PATENT DOCUMENTS

| | | | |
|---|---|---|---|
| 1,540,753 | 6/1925 | Birch | 248/354 R |
| 3,186,570 | 6/1965 | Bunnell | 248/354 R X |
| 3,324,613 | 6/1967 | Duboff | 248/354 R X |
| 3,367,614 | 2/1968 | Leonard | 248/354 R |

FOREIGN PATENT DOCUMENTS

| | | | |
|---|---|---|---|
| 2507577 | 8/1975 | Fed. Rep. of Germany | 248/354 R |
| 771160 | 3/1957 | United Kingdom | 280/763 |

Primary Examiner—Randolph A. Reese
Assistant Examiner—D. W. Underwood
Attorney, Agent, or Firm—Harvey B. Jacobson

[57] ABSTRACT

An elongated strut having first and second large and small diameter relatively telescoped opposite end portions. The free end of the large diameter end portion includes a mount for mounting a corresponding vehicle side with the strut downwardly and outwardly inclined from the vehicle side. The free end of the small diameter end portion includes a relatively extendable spring biased foot portion for engagement with the ground and a generally horizontal brace is provided including a first end for anchoring relative to the corresponding vehicle side and a second end including clamp structure removably clampingly engaged with the strut small diameter end portion immediately adjacent and abutting the corresponding strut large diameter end portion to limit telescoping of the small diameter strut end portion into the strut large diameter end portion.

10 Claims, 7 Drawing Figures

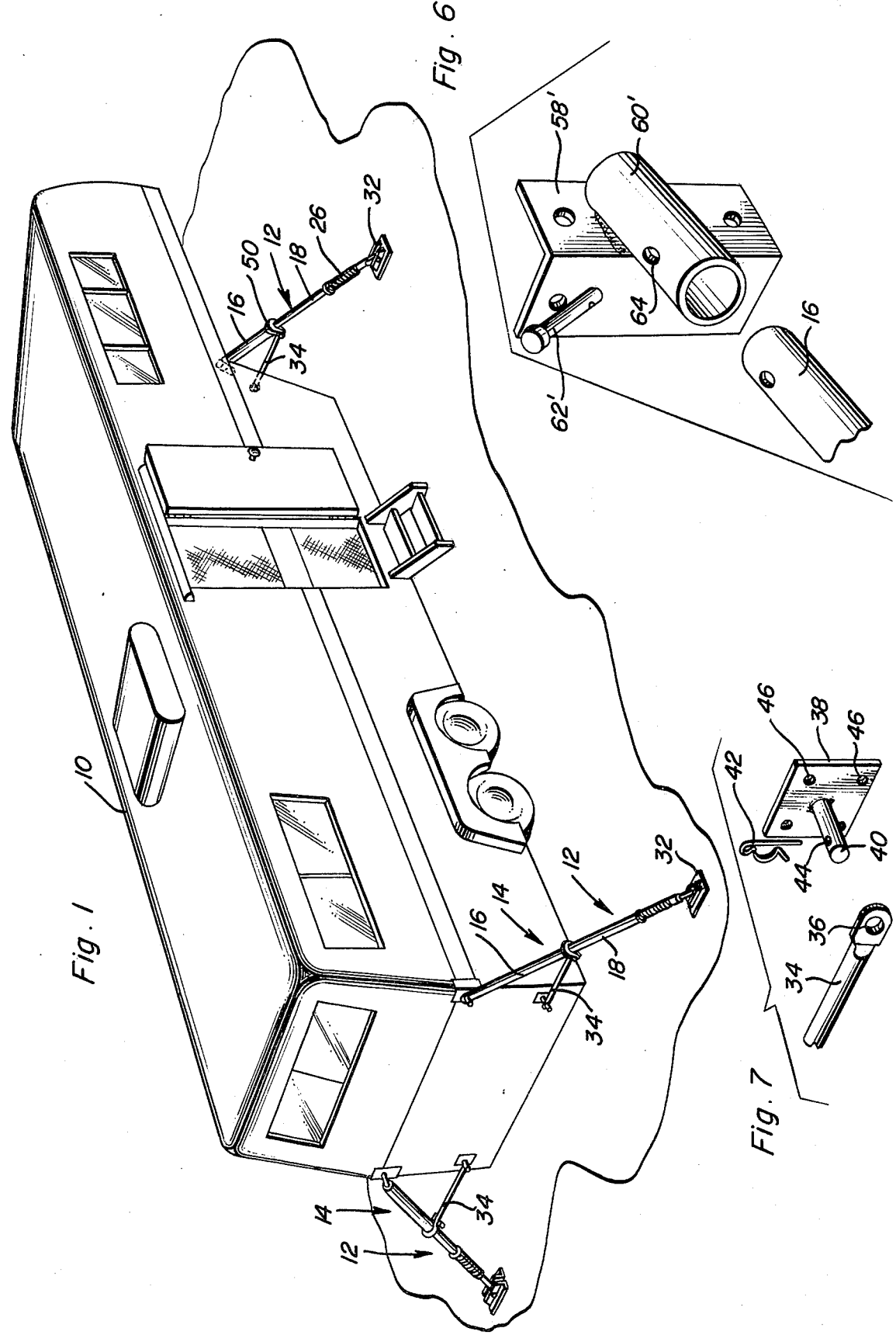

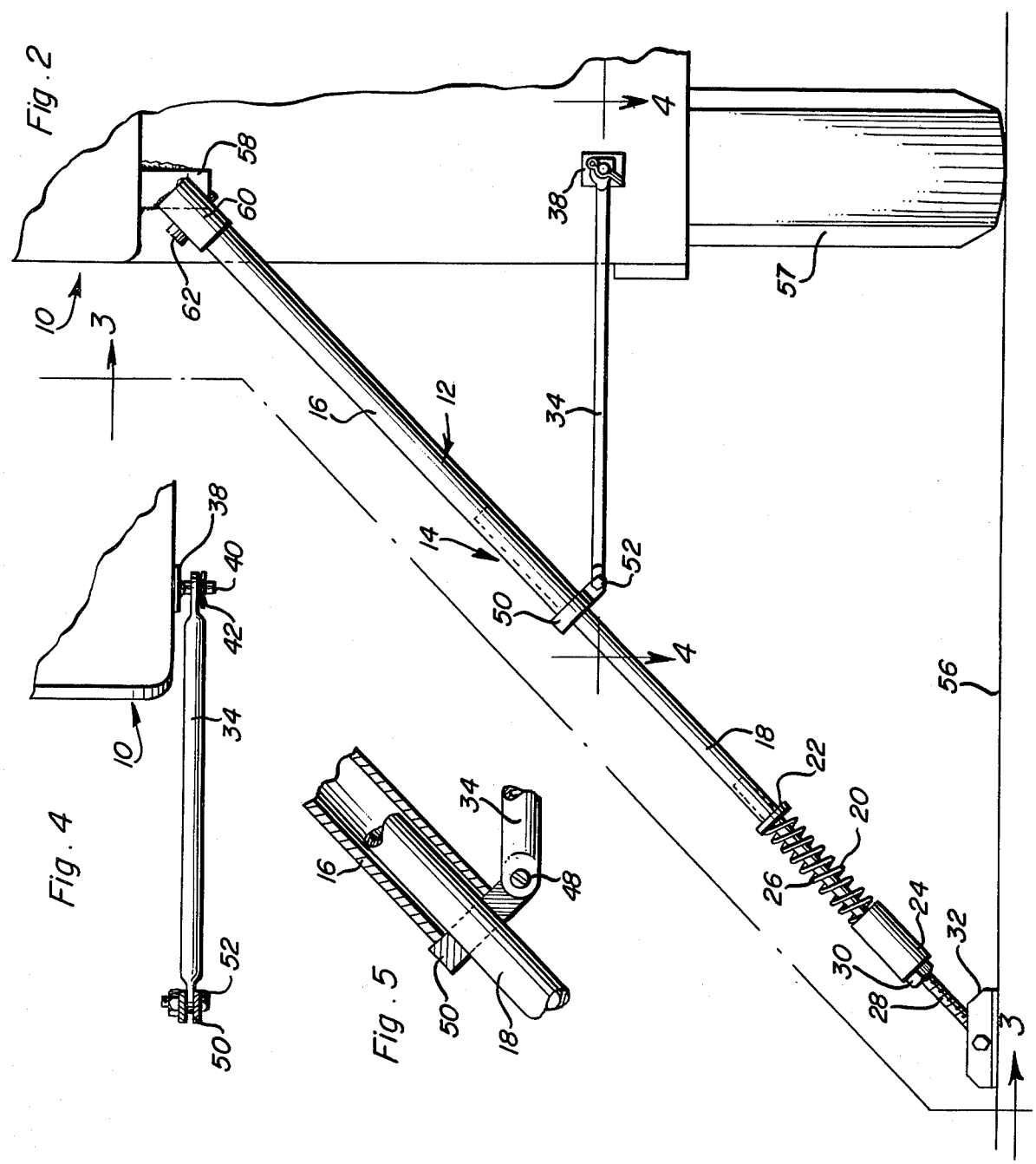

4,268,066

RECREATIONAL VEHICLE WIND STABILIZER

BACKGROUND OF THE INVENTION

Various forms of stabilizers have been heretofore provided for the purpose of stabilizing recreational and other vehicles equipped with wheeled running gear. Examples of various forms of these previously known stabilizers as well as other structures including some of the general structural and operational features of the instant invention are disclosed in U.S. Pat. Nos. 2,583,945, 2,634,941, 2,966,321, 3,537,724, 3,692,329, 3,879,055 and 4,070,041.

However, these previously known forms of stabilizers or struts and similar devices are not particularly well adapted to provide the desired levelling function as well as the function of absorbing lateral wind thrust. Accordingly, a need exists for a recreational vehicle body stabilizer which may not only be utilized as a levelling apparatus for levelling the body of the recreational vehicle, but which will also serve the purpose of yieldably resisting lateral shifting of the recreational body due to wind incident thereon.

BRIEF DESCRIPTION OF THE INVENTION

The stabilizer of the instant invention includes an inclined strut including a mount at its upper end for releasable attachment to the side of a recreational vehicle and a spring biased telescopic foot at its lower end for engagement with the ground. The strut includes relatively telescoped large and small upper and lower end portions and a generally horizontal brace is provided with one end of the brace adapted for securement to the associated vehicle side and the other end of the brace including a slip-type clamp collar mounted thereon clampingly engaged with the upper portion of the small diameter lower end portion and abutted against the lower end of the large upper diameter end portion to thereby limit upward telescoping of the lower diameter end portion into the upper larger diameter end portion of the strut.

The main object of this invention is to provide a body stabilizer for recreational vehicles which will not only enable the body to be levelled, but which will also afford yieldable resistance against lateral shifting of the vehicle body due to strong side winds thereon.

Another object of this invention is to provide a vehicle body stabilizer which may be readily adjusted for use in conjunction with different size vehicle bodies.

Still another important object of this invention is to provide a stabilizer which may be readily disengaged from the associated vehicle side for compact storage when not in use.

A further object of this invention is to provide a vehicle wind stabilizer which may be readily installed through the utilization of simple tools.

A final object of this invention to be specifically enumerated herein is to provide a vehicle wind stabilizer in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a recreational vehicle equipped with four of the stabilizers of the instant invention;

FIG. 2 is an enlarged fragmentary front elevational view of the left side of the vehicle body;

FIG. 3 is a fragmentary side elevational view taken substantially upon the section line 3—3 of FIG. 2;

FIG. 4 is a horizontal sectional view taken substantially upon the plane indicated by the section line 4—4 of FIG. 2;

FIG. 5 is an enlarged fragmentary vertical sectional view taken substantially upon the plane indicated by the section line 5—5 of FIG. 3;

FIG. 6 is an exploded perspective view of the upper end portion of a strut and a first form of mounting bracket to be utilized in conjunction therewith; and FIG. 7 is an exploded perspective view of the anchor structure for the brace portion of the strut.

DETAILED DESCRIPTION OF THE INVENTION

Referring now more specifically to the drawings, the numeral 10 generally designates a conventional form of fifth wheel trailer with which the wind stabilizer of the instant invention is illustrated in use in FIGS. 1 through 4.

The stabilizer of the instant invention is referred to in general by the reference numeral 12 and defines an inclined strut referred to in general by the reference numeral 14 including large and small diameter relatively telescoped upper and lower end portions 16 and 18. The upper and lower ends of the end portions 18 and 16 are relatively telescopingly engaged and the lower end of the end portion 18 includes a smaller diameter extendable foot arm 20 telescoped therein. A stop collar 22 is secured to the lower end of the end portion 18 and a tubular abutment structure 24 is carried by the lower portion of the foot arm 20 with a compression spring 26 disposed on the foot arm 20 and having its upper end abutted with the stop collar 22 and its lower end seated within the abutment sleeve 24. The foot arm 20 is externally threaded as at 28 and has an abutment nut 30 threadedly engaged thereon against which the lower end of the abutment sleeve 24 is abutted. The lower terminal end of the foot arm 20 is provided with a pivotally mounted ground engageable foot 32.

In addition to the strut 14, the stabilizer 12 includes an elongated horizontal brace 34. One end of the brace 34 is flattened and horizontally apertured as at 36 and a mounting plate 38 equipped with an outstanding pin 40 is secured to the vehicle 10. The apertured and flattened end of the brace 34 is telescoped over the pin 40 and releasably secured thereon by means of a spring clip 42 having a portion thereof passed through a diametric bore 44 formed in the outer end of the pin 40. The mounting plate 38 is provided with four corner apertures 46 through which suitable fasteners (not shown) may be utilized in mounting the plate 38 on the vehicle 10 adjacent one side thereof. The second end of the brace 34 is flattened and similarly apertured as at 48 and the apertured and flattened end 48 is received between the closely adjacent ends of a collar-type split clamp 50 having a fastener 52 secured through its ends in order to draw the ends, and thus the clamp 50, tightly about the end portion 18 immediately adjacent and disposed in position to abut the lower end of the end portion 16. Thus, with the clamp 50 tightly clamped about the end portion 18 and abutted against the end portion 16, telescoping of the end portion 18 into the end portion 16 is limited. The foot arm 20 is slidingly telescoped into the lower end of the end portion 18 and is thus spring biased into engagement with the ground 56 upon which the wheels 57 of the vehicle 10 rest.

A further mounting plate 58 is provided and may be secured to the vehicle 10 in substantially the same manner as the mounting plate 38 is secured to the vehicle 10. The mounting plate 58 includes a socket defining sleeve 60 supported therefrom opening downwardly at approximately a 45° angle and the upper end of the end portion 16 is seatingly telescopingly received in the socket defining sleeve 60 and is removably secured therein by means of a removal lock pin 62.

As may best be seen from FIG. 1 of the drawings, the opposite sides of the vehicle 10 each have a pair of front and rear stabilizers 12 supported therefrom. Further, with attention invited more specifically to FIG. 6 of the drawings, there may be seen a modified form of mounting plate 58' which is similar to the mounting plate 58, but which is L-shaped in horizontal plan so as to be adapted for securement to a vertical corner of the body of the vehicle 10. The mounting plate 58' includes a socket defining sleeve 60' corresponding to the sleeve 60 and the sleeve 60' is apertured as at 64 to receive the locking pin 62' corresponding to the locking pin 62. It will be noted from FIG. 2 of the drawings that the mounting plate 58 is secured to a forwardly facing surface of the vehicle 10 and that the mounting plates 58' are secured to the rear corner portions of the vehicle 10. The sleeves 60 and 60' are secured, as by welding, to the corresponding mounting plates 58 and 58' and the nuts 30 may be turned after the stabilizers are initially mounted in order to apply the desired spring pressure upon the ground 56. The clamp 50 may be constructed in a manner whereby the braces 34 have their adjacent ends pivotally supported from the fasteners 52, even when the split clamps 50 are tightened about the end portions 18.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a recreational vehicle of the type including wheeled running gear and a body spring supported from said running gear, a plurality of opposite side vehicle wind stabilizers, each of said stabilizers including an elongated strut having first and second large and small diameter relatively telescoped opposite end portions, the ends of said first end portions remote from said second end portions including mounting means mounted on a corresponding side of said vehicle body, the free ends of said second end portions remote from said first end portions including relatively extendably adjustable spring biased foot portions for engagement with the ground, a plurality of elongated braces including first and second ends, said first ends of said braces each being anchored to the corresponding side of said vehicle and said second ends of said braces each being anchored relative to the corresponding strut intermediate its opposite ends, and adjustable abutment means supported from and adjustable along the corresponding strut small diameter end portion immediately adjacent the corresponding strut large diameter end portion and abutted thereagainst to limit telescoping of the small diameter strut end portions into said strut large diameter end portions, said struts extending downwardly and outwardly from the corresponding sides of said body said abutment means being adjustable independently of said spring biased foot portions.

2. The combination of claim 1 wherein said braces are generally horizontally disposed.

3. The combination of claim 1 wherein said mounting means define downwardly opening sockets in which the upper terminal ends of said struts are removably anchored.

4. The combination of claim 1 wherein said second ends of said braces are pivotally anchored to said abutment means and said brace first ends are removably anchored to said vehicle.

5. A stabilizer for use in levelling and stabilizing the body of a recreational vehicle, said stabilizer including an elongated strut having first and second upper and lower relatively extendable end portions, the upper end of said upper end portion including first anchor means for anchoring said strut to said body with said strut inclined downwardly and outwardly away from said body, the lower end of said lower end portion including an endwise outwardly extendably adjustable spring biased ground engageable foot assembly, and an elongated brace including second anchor means on one end for anchoring relative to said body below said first anchor means, the other end of said brace including abutment means releasably secureable in adjusted position along one of said end portions and abuttingly engaged by the other end portion to limit relative contraction of said end portions said abutment means being adjustable independently of said spring biased foot assembly.

6. The combination of claim 5 wherein said brace is generally horizontally disposed.

7. The combination of claim 5 wherein said first anchor means includes an anchor mount for securement to said body and defining a downwardly opening socket in which the upper end of said upper end portion is releasably anchored.

8. The combination of claim 5 wherein said upper and lower end portions are telescopingly engaged and said clamp means comprises a clamp member clampingly engaged about the inner telescoped member.

9. The combination of claim 8 wherein said inner telescoped member comprises said lower end portion.

10. The combination of claim 1 wherein said abutment means includes clamp assemblies mounted on said second end portions for adjustable shifting therealong and releasably clamped in position relative thereto, said second ends of said braces being anchored relative to said clamp assemblies.

* * * * *